United States Patent [19]

Booth et al.

[11] Patent Number: 4,683,975

[45] Date of Patent: Aug. 4, 1987

[54] VEHICLE POWER WINDOW CONTROL

[75] Inventors: Thomas L. Booth, Birmingham; Edgar H. Schlaps, Washington; Ronald J. Wilde, St. Clair Shores, all of Mich.

[73] Assignee: General Motors Corporation, Detroit, Mich.

[21] Appl. No.: 913,531

[22] Filed: Sep. 30, 1986

[51] Int. Cl.[4] ........................ B60R 25/04; F05B 47/00; H02P 1/22

[52] U.S. Cl. .................................... 180/289; 318/280; 318/282

[58] Field of Search .................... 180/289; 307/10 AT; 318/282, 280, 283, 264

[56] References Cited

U.S. PATENT DOCUMENTS

| | | | |
|---|---|---|---|
| 4,001,661 | 1/1977 | Terabayashi | 318/264 |
| 4,240,516 | 12/1980 | Henderson et al. | 180/289 |
| 4,373,149 | 2/1983 | Coste | 318/281 |
| 4,394,605 | 7/1983 | Terazawa | 318/280 |
| 4,427,929 | 1/1984 | Andrei-Alexandru | 318/282 |
| 4,450,390 | 5/1984 | Andrei-Alexandru | 318/282 |
| 4,476,416 | 10/1984 | Licata et al. | 318/283 |
| 4,562,387 | 12/1985 | Lehnhoff | 318/285 |
| 4,575,662 | 3/1986 | Lehnhoff | 318/282 |

*Primary Examiner*—Richard A. Bertsch
*Attorney, Agent, or Firm*—Robert M. Sigler

[57] ABSTRACT

A power window control for a motor vehicle provides express or one-touch movement in response to short activations of a control element and traditional power window movement during activation of the control element for longer periods. The control provides for automatic window closing with activation of a power door lock element, as long as the ignition is off unless the ignition key is in the ignition switch and the driver's door is open. This allows single touch vehicle locking but helps prevents the operator from locking himself out of the vehicle with the key still inside. Window movement, once initiated in the open or close direction, is stopped in response to motor stall when the open or closed limit is reached. It is also stopped in the closing direction and reversed to the opening direction in response to a special impediment sensor comprising a flexible tube with an inner reflective surface adjacent the window closing path which directs light from an oscillator controlled light sending element to a light sensing circuit electronically synchronized with the sending element, when an impediment is pushed by the closing window into the tube to collapse it and block the light communication. Circuitry is disclosed for accomplishing the aforementioned features.

3 Claims, 6 Drawing Figures

VEHICLE POWER WINDOW CONTROL

SUMMARY OF THE INVENTION

This invention relates to power window controls for motor vehicles, and particularly to such controls of the express or one-touch variety, wherein the operator may initiate window movement with a single activation of a control element; and the window will continue to move until stopped by a sensor or another activation of a control element. Such controls also may provide for the more traditional power window movement which lasts only during activation of the control element if the control element is activated for a time period longer than a predetermined reference time period.

In addition to the features listed above, the control of this invention also provides for automatic window closing with activation of a power door lock element if the ignition switch is in its off condition and the driver's door is closed. This allows single touch vehicle locking and window closing. However, this feature is inhibited if the ignition is on or if the ignition is off, the driver's door is open and the ignition key is in the ignition. This helps prevent the driver from locking himself out of his car. Window movement, once initiated in the opening or closing directions, is stopped in response to motor stall when the open or closed limit is reached. It is also stopped in the closing direction and reversed to the opening direction in response to a special impediment sensor comprising a flexible tube with an inner reflective surface adjacent the window closing path which directs light from an oscillator controlled light sending element to a light sensing circuit electronically synchronized with the sending element, when an impediment is pushed by the closing window into the tube to collapse it and block the light communication.

The features described above and other desirable features and advantages are obtained from electrical circuitry designed for efficiency and reliability as well as ease of assembly, which circuitry will be described in detail in the accompanying drawings and following description of a preferred embodiment.

DESCRIPTION OF A PREFERRED EMBODIMENT

Figure 1:
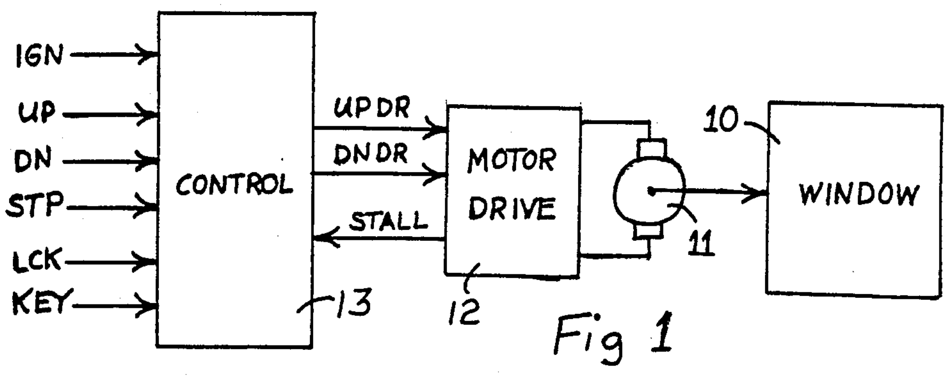
FIG. 1 is a block diagram of a power window control according to the invention.

Referring to FIG. 1, a vehicle window 10 is adapted to be moved between open and closed positions by reversible DC motor 11. Motor 11 is driven in a selected direction by motor drive 12 in response to signals from control 13 in a manner to be described. Generally, control 13 comprises the circuits shown in FIGS. 2, 3 and 5; motor drive 12 comprises the circuit shown in FIG. 4; and the circuit of FIG. 6 is one embodiment of a window stopping circuit which is capable of providing a stop (STP) signal to control 13.

Figure 2:
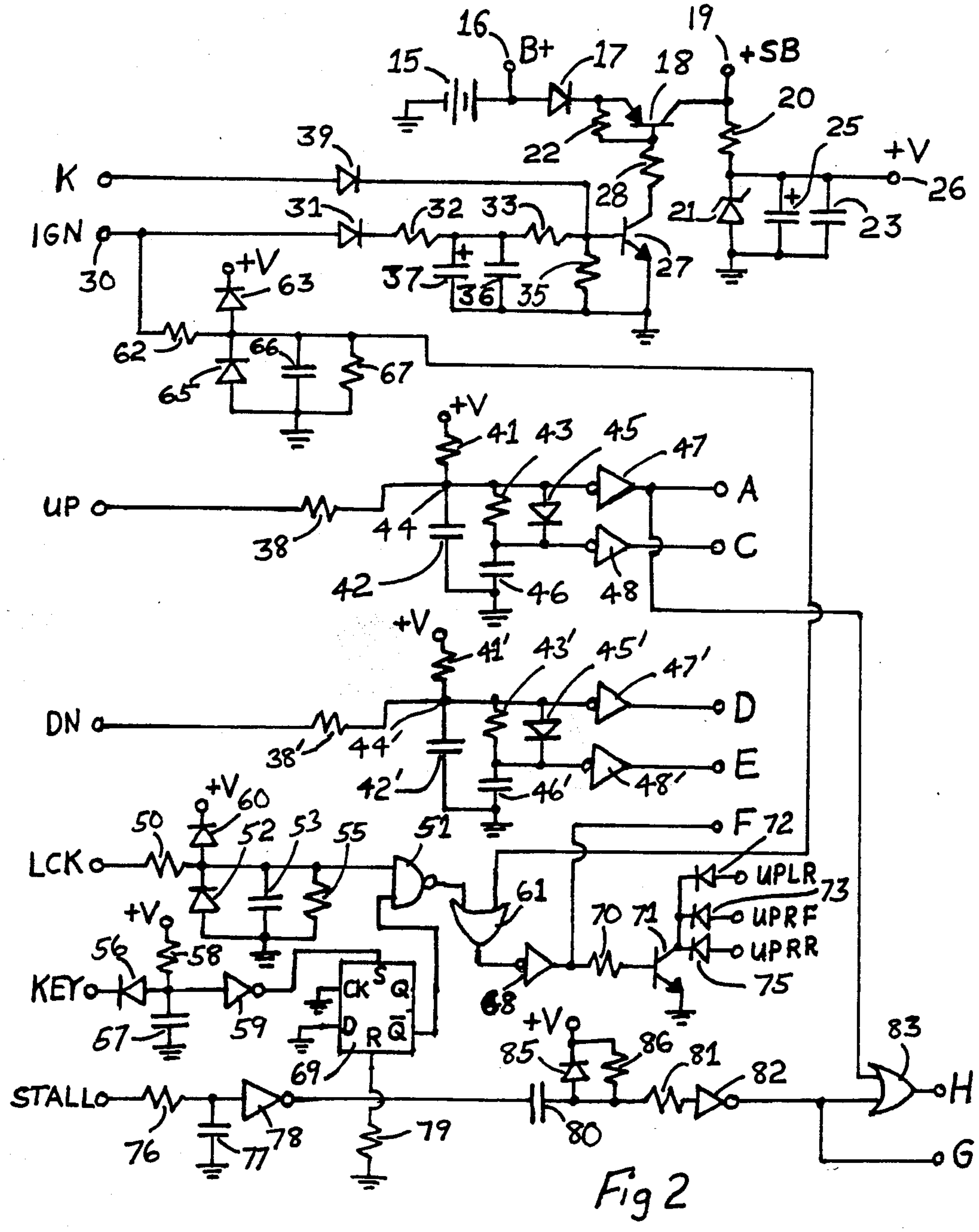
FIGS. 2, 3 and 5 are circuit diagrams of a control for use in the power window control of FIG. 1.

Referring to FIG. 2, most of the input circuitry of control 13 is shown. A vehicle battery 15, which symbolizes the standard vehicle electrical system, provides DC electric power at approximately 13.5 volts to an unswitched B+ terminal 16 and a switched power supply comprising the following elements. The ungrounded terminal of battery 15 is connected in series through a diode 17, emitter and collector of a PNP transistor 18 (MPSA64), resistor 20 (100) and zener diode 21 (16 V) to ground. The collector of transistor 18 comprises a +SB terminal 19. A biasing resistor 22 (10K) is connected between emitter and base of transistor 18. Capacitor 23 (0.01 $\mu$F) and electrolytic capacitor 25 (10 $\mu$F) are connected in parallel with zener diode 21, the cathode of which comprises a +V terminal 26, which provides essentially 12 volts DC when transistor 18 is turned on.

The conducting state of transistor 18 is controlled by an NPN transistor 27 (2N4124) having a grounded emitter and a collector connected to the base of transistor 18 through a load resistor 28 (1K). When transistor 27 is turned on, it biases transistor 18 into conduction. There are two ways of turning on transistor 27. The first is a high IGN signal on IGN terminal 30, which is connected through a diode 31, a resistor 32 (100) and another resistor 33 (22K) to the base of transistor 27. The base of transistor 27 is connected to its emitter through a biasing resistor 35 (220K). The base of transistor 27 has a connection through a diode 39 from an internal circuit connection K, which provides the other means of turning on transistor 27. The junction of resistors 32 and 33 is connected to ground through a capacitor 36 (0.01 $\mu$F) and a parallel electrolytic capacitor 37 (470 $\mu$F). The IGN signal is derived from the vehicle ignition switch, not shown, which thus turns on transistors 27 and 18 to provide voltages +SB and +V when when the switch is changed from an off to a run condition. However, changing the ignition switch back to an off condition does not necessarily turn off transistors 27 and 18, since transistor 27 is held on by the voltage on capacitors 36 and 37 while they discharge. This provides electric power for vehicle window operation for a limited time after the vehicle ignition is turned off. In addition, a high voltage on internal circuit connection K, described below in connection with this Figure, will also hold on transistors 27 and 18 while motor 11 is being actuated so that an opening or closing, once begun, will not be stopped short of completion by the discharge of the aforementioned capacitors. Terminals 16 (B+), 19 (+SB) and 26 (+V) are understood to be connected to all similarly labeled terminals in the circuits of FIGS. 2–6 to provide the appropriate power thereto.

A vehicle window operating switch, not shown, is capable of being actuated, alternatively, in window up or window down directions. If it is operated in a window up direction, a ground signal is provided to the UP terminal and from there through a resistor 38 to the junction 44 of a resistor 41 (3.3K) connected to +V and a capacitor 42 (10 $\mu$F) connected to ground. Junction 44 is further connected to ground through a parallel combination of resistor 43 (100K) and diode 45 in series with a capacitor 46 (10 $\mu$F). An inverter 47 connects junction 44 to an internal circuit connection A; and an inverter 48 connects the anode of diode 45 to an internal circuit connection C, connections A and C being further connected as shown in FIG. 3.

Capacitor 42 provides debouncing for the signal from the operating switch applied through the UP terminal, since it is normally charged and takes a small but finite time to discharge through resistor 38 when the UP terminal is switched low. Elements 43, 45 and 46 comprise an RC timing circuit with a time constant of approximately one-half second when the UP terminal is switched low and a much faster time constant when the UP terminal is ungrounded and junction 44 starts going high. When the UP terminal is switched low, the voltage at connection A goes high after the small debounce delay. However, since capacitor 46 must discharge through resistor 43, the voltage at connection C does not go high until after the half second delay. As will be described at a later point in connection with the circuit of FIG. 3, connection C provides a signal for manual override of one touch action, so that the window control will operate in the normally expected manner with window movement only during switch activation if the switch is held for longer than the half second of the time constant. Of course, the half second time constant may be adjusted to some other time if it appears desirable.

Figure 3:
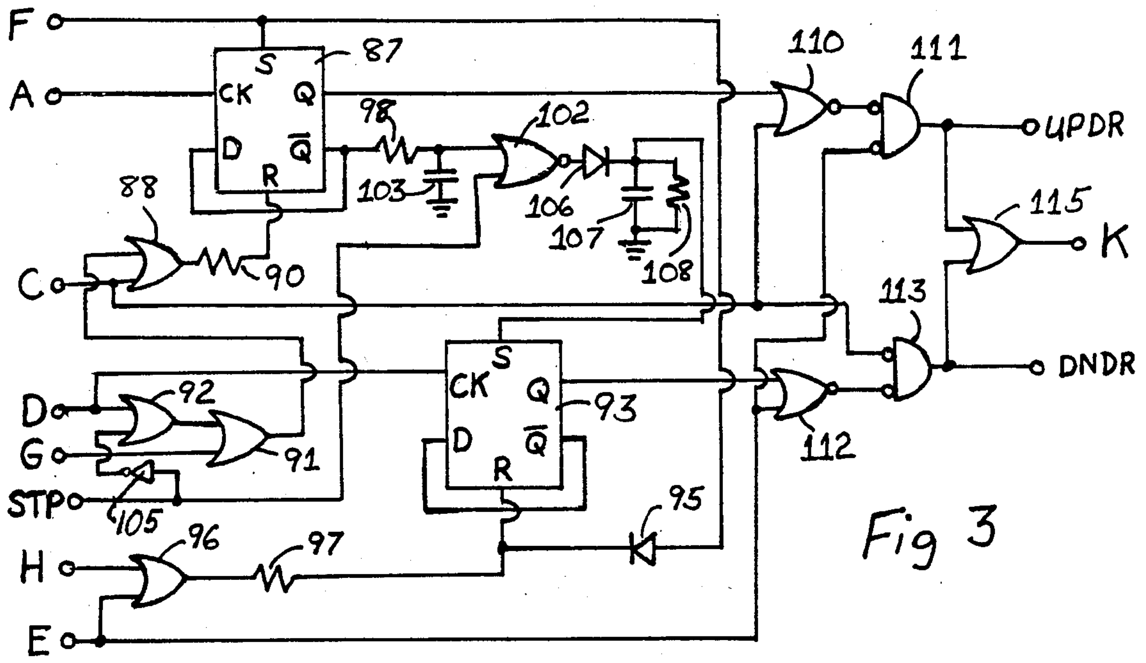

Similarly, if the window operating switch is moved in the window down direction, a ground signal voltage is provided to the DN terminal and from there through similarly numbered primed circuit elements to connections D and E, which also connect as shown in FIG. 3.

A lock activation signal is provided from a vehicle power lock circuit, not shown, to a LCK terminal and from there through a resistor 50 (1K) to one input of a NAND gate 51 (4011), which is connected to ground through the parallel combination of a reverse biased diode 52, a capacitor 53 (0.01 μF) and a resistor 55 (10K) and to +V through a reverse biased diode 60. The LCK signal is high only when the vehicle power lock switch is being activated.

A signal from an ignition key warning system, not shown, is provided to the KEY terminal and from there, through a reversed diode 56 and inverting buffer 59 to the set input of a flip-flop 69 (4013) having a NOT Q output connected to the other input of NAND gate 51. The input of inverting buffer 59 is connected to ground through a capacitor 57 (0.01 μF) and to +V through a resistor 58 (10K). Flip-flop 69 further has a grounded CK input and may have a grounded D input. The reset input of flip-flop 69 is connected to ground through a resistor 79 (200K). The KEY terminal may be connected to the switch input (circuit #80 in the service manual) of a standard chime module provided on many vehicles by the assignee of this invention, the switch input also being connected through an ignition key sensing switch and a driver's door jamb switch to ground. Thus, the KEY signal will be high unless the key is in the ignition switch (closed key sensing switch) and the driver's door is open (closed door jamb switch), in which case it will be low. This input provides the ability to prevent automatic window closing with power door lock activation if the key is in the ignition and the driver's door is open, which is a typical situation in which an operator might otherwise lock himself out of the vehicle.

The output of NAND gate 51 is provided to an input of an OR gate 61, the other input of which is connected through a resistor 62 (1K) to the IGN terminal, through a reverse biased diode 63 to +V and through the parallel combination of a diode 65, capacitor 66 (0.01 μF) and resistor 67 (4.7K) to ground. Thus, the output of OR gate 61 is low only when the IGN terminal is low (ignition off), the LCK terminal high (power locks actuated) and the KEY terminal is pulled high by resistor 58 (key not in ignition or door closed).

The output of OR gate 61 is inverted in inverter 68, the output of which is internal circuit connection F and is also connected through a resistor 70 (2.2K) to the base of a grounded emitter NPN transistor 71 (2N4124) having a collector connected in parallel through diodes 72, 73 and 75 to terminals UPLR, UPRF and UPRR, respectively. These terminals provide connection to the activating circuits of the other window control circuits in the vehicle, so that all the vehicle's windows will close in response to door lock actuation. As will be seen at a later point, a high signal on connection F, which is produced, through inverter 68, from a low output of OR gate 61, initiates closing movement of the window.

A STALL terminal receives an input from motor drive 12 when motor 11 stalls as the window reaches the end of its travel in the open or close directions. This signal is used to terminate the motor drive command from control 13. The STALL terminal is connected in series through an RC filter comprising a resistor 76 and a capacitor 77 to ground, an inverter 78, a capacitor 80 (0.1 μF), a resistor 81 (200K) and another inverter 82 to an internal circuit connection G and an input to an OR gate 83 having another input from the output of inverter 47 and an output to internal circuit connection H. The junction of capacitor 80 and resistor 81 is connected to +V through a reverse biased diode 85 in parallel with a resistor 86 (100K).

Referring to FIG. 3, an up flip-flop 87 (4013) is clocked from connection A and set from connection F. The Q NOT output is connected to the D input to produce toggle operation when clocked; and the reset input receives the voltage on connection C through an OR gate 88 (4071) and resistor 90 (200K). Also received through OR gate 88 is the output of an OR gate 91 (4071), which has an input from connection G and another input from an OR gate 92 (4071). OR gate 92 has inputs from connection D and, through an inverter 105, from a STP terminal, from which it receives a stop signal such as that produced by the circuit of FIG. 6, as yet to be described.

A down flip-flop 93 (4013) is clocked from connection D and reset from connection F through a diode 95. Flip-flop 93 may also be reset from connections E or H through an OR gate 96 (4071) and resistor 97 (200K). Its Q NOT output is connected back to its D input for toggle operation. The Q NOT output of flip-flop 87 is connected through a series resistor 98 (200K) to an input of a NOR gate 102 (4001) having a capacitor 103 (0.2 μF) to ground. The STP terminal is connected to the other input of NOR gate 102. The output of NOR gate 102 is connected through a diode 106 to the set input of flip-flop 93, the cathode of diode 106 being connected through a capacitor 107 (0.2 μF) and resistor 108 (200K) to ground.

The Q output of flip-flop 87 and the C connection are connected to the inputs of a NOR gate 110 (4001) having an output connected, along with connection E, to the inverting inputs of an AND gate 111 (4001). The output of AND gate 111 comprises an UPDR or up drive terminal, which is high to produce motor drive in the up or window closing direction. The Q output of flip-flop 93 and the E connection are connected to the inputs of a NOR gate 112 (4001), the output of which is connected, along with connection C, to the inverting inputs of an AND gate 113 (4001). The output of AND gate 113 comprises a DNDR or down drive terminal, which is high to produce motor drive in the down or window opening direction. The outputs of AND gates 111 and 113 are provided to the inputs of an OR gate 115 (4071) having an output connected to internal circuit connection K, which is connected back to the circuit of FIG. 2. This provides the motor running signal which may be used to force completion of a window opening or closing operation after the ignition switch is put in an off condition, as previously described.

Briefly, an activation of the window switch in the up direction produces a high voltage at connection A to clock flip-flop 87 to a high Q output which generates a high UPDR signal. It also sends connection H high to reset flip-flop 93. If the switch is quickly released, a subsequent activation of the switch in the up direction toggles flip-flop 87 to a low Q output to send UPDR low and stop the window. An activation in the down direction resets flip-flop 87 through the reset input with the same result but also clocks flip-flop 93 to generate a high DNDR signal to reverse the window direction. If the switch, after its original activation in the up direction, is held for longer than a predetermined period such as one-half second, connection C goes high to reset flip-flop 87 but provide an alternate high voltage to NOR gate 110 to continue the UPDR signal as long as the switch is held. This produces the normally expected power window control, in which the window moves only while the switch is held. The window down operation is similar. The STALL signal is applied through connections G and H to reset both flip-flops and thus stop motor operation regardless of direction. The STP signal resets flip-flop 87 to stop up movement and sets flip-flop 93 to initiate down movement of the window. A high voltage at connection F, initiated by the door lock button, does just the opposite to initiate up window movement.

Figure 4:
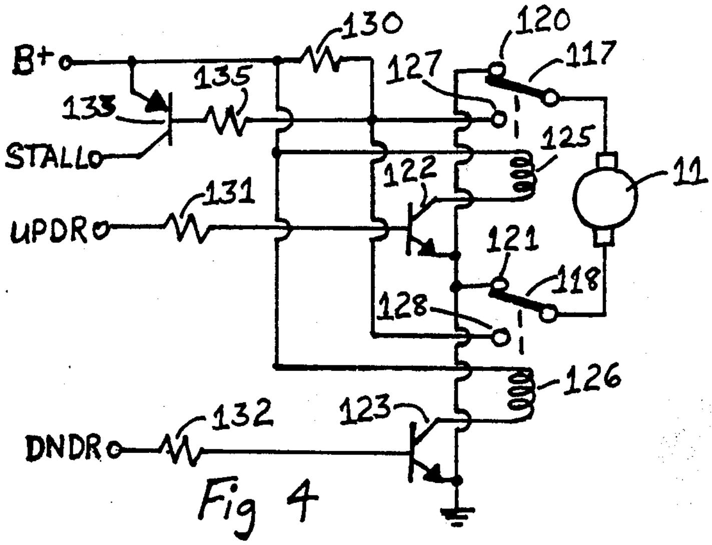
FIG. 4 is a motor drive for the power window control of FIG. 1.

An embodiment of a typical motor drive 12 for use with motor 11 and control 13 is shown in FIG. 4. Motor 11 has armature terminals connected to the armatures 117 and 118 of relays having grounded, normally closed contacts 120 and 121, respectively. Relay activating transistors 122 and 123 of the NPN type have grounded emitters and collectors connected through relay coils 125 and 126, respectively, to B+. The normally open contacts 127 and 128 are connected through a low resistance, high wattage, current sensing resistor 130 to B+. Terminal UPDR is connected through a resistor 131 to the base of transistor 122 to actuate relay armature 117 and produce window closing motor operation; and terminal DNDR is connected through a resistor 132 to the base of transistor 123 to actuate relay armature 118 and produce window opening motor operation. A PNP transistor 133 having an emitter connected to B+and a base connected through a resistor 135 to the other side of the current sensing resistor 130 provides, at its collector, a STALL signal indicative of motor armature stall current, which is supplied through the STALL terminal to the circuit of FIG. 2. Thus motor activation in the window up and down directions is produced in response to the voltages on the UPDR and DNDR terminals; and a stall signal is produced on the STALL terminal when motor stall current through resistor 130 increases sufficiently to turn on transistor 133.

Figure 5:
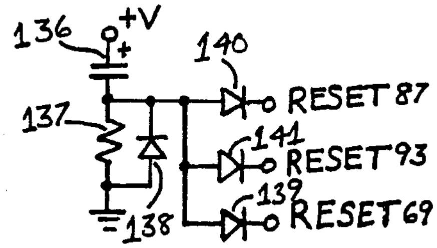
Figure 6:
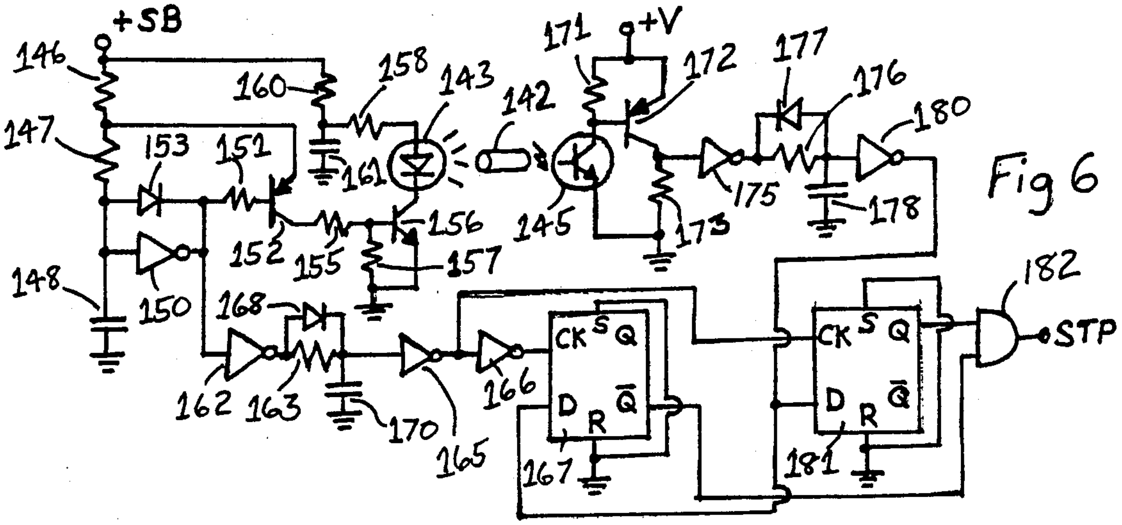
FIG. 6 is a circuit effective to generate the signal labeled "STP" in the power window control of FIG. 1.

FIG. 5 shows an automatic power up reset circuit. An electrolytic capacitor 136 (10 μF) and resistor 137 (200K) are connected in series between +V and ground. A reverse biased diode 138 is connected in parallel with resistor 137. Diodes 140, 141 and 139 are connected in parallel from the junction of capacitor 136 and resistor 137 to the reset terminals of flip-flops 87 and 93 of FIG. 3 and the reset terminal of flip-flop 69 of FIG. 2, respectively, as indicated by the RESET labels in FIG. 5. In operation, as power is first switched to +V, the charging current for capacitor 136 produces a high voltage drop across resistor 137 to generate the reset signals. After capacitor 136 is quickly charged, however, this voltage goes low and stays low until +V is switched off and then on again.

A special stop signal STP may be generated by the circuit of FIG. 6 or any equivalent circuit. This signal provides immediate cessation of window closing and reversal of motor operation to window opening operation if an impediment is sensed in the window's path. A long, narrow, flexible tube with a reflective inner surface is disposed adjacent the window frame at the top thereof just beside the window path so that it is not engaged by the window itself but will be engaged by an impediment projecting through the window as the rising window pushes the impediment toward it. The tube is symbolized by tube 142 of FIG. 6, although the actual tube will conform in length and shape to the top of the window frame. An LED 143 (SFH484) at one end of the tube generates pulses of infrared light which are conducted down the interior of the tube and normally sensed by a phototransistor 145 (BP103) at the other end. If the tube is pinched closed somewhere along its length by an impediment, however, the light is blocked and cannot be sensed by phototransistor 145, whereupon the circuit generates the signal STP and provides it to the circuit of FIG. 3.

In more detail, FIG. 6 shows a resistor 146 (100), a resistor 147 (75–125K) and a capacitor 148 (0.1 μF) connected between +SB and ground. The junction of capacitor 148 and resistor 147 is connected through an inverter 150 and resistor 151 (4.3K) to the base of a PNP transistor 152 (2N3906) having an emitter connected to the junction of resistors 146 and 147. A diode 153 is connected in parallel with inverter 150. Resistors 146 and 147, capacitor 148, inverter 150 and diode 153 form a rectangular wave oscillator adjusted for a low duty cycle, which switches transistor 152. The collector of transistor 152 is connected through a voltage divider comprising resistors 155 (10K) and 157 (10K) to the base of an NPN transistor 156 (0238) having a grounded emitter and a collector connected through LED 143 in series with resistors 158 (<10) and 160 (120) to +SB. The junction of resistors 158 and 160 is connected through a capacitor 161 (2.2 μF) to ground. These elements form a driving circuit for LED 143 which is switched by transistor 152 to energize LED 143 for short bursts of light, which light is conducted down tube 142.

The output of inverter 150 is also connected through an inverter 162, resistor 163 (<200K), inverter 165 and inverter 166 to the clock (CK) input of a flip-flop 167. A diode 168 is connected in parallel with resistor 163; and a capacitor 170 (0.01 μF) is connected from the cathode of diode 168 to ground. The combination of diode 168, resistor 163 and capacitor 170 form a filter in the form of a pulse stretching circuit to increase the duty cycle of the oscillator before applying the pulses to flip-flop 167 and a flip-flop 181 yet to be defined.

At the receiving end of tube 142, phototransistor 145 has a grounded emitter and a collector connected through a load resistor 171 (10M) to +V and directly to the base of a PNP transistor 172 (2N3906) with an emitter connected to +V and a collector connected through a load resistor 173 (100K) to ground. The collector of transistor 172 is connected through an inverter 175 to another pulse stretching circuit comprising a parallel resistor 176 (<200K) and diode 177 with a capacitor 178 (0.01 μF) to ground, the capacitor output of the circuit being connected through an inverter 180 to the D input of flip-flop 167 (4013) and the D input of a flip-flop 181 (4013). Flip-flop 181 is clocked by the output of inverter 165. The Q NOT output of flip-flop 167 and the Q output of flip-flop 181 are provided to the inputs of an AND gate 182 (4081), which provides at its output the signal STP for application to the STP terminal of FIG. 3.

In the operation of the circuit of FIG. 6, the oscillator comprising elements 146–153 switches transistor 156 on and off with a comparatively low duty cycle of, for example, 5 microseconds on and 1 millisecond off. Since LED 143 is in series with transistor 156, it is switched at the same frequency, drawing current during the transistor on state from capacitor 161. Capacitor 161 is recharged during each cycle during the off state of transistor 156. The low value of resistor 158 allows driving of LED 143, while the higher value of resistor 160 prevents overloading of the vehicle power supply.

The light pulses from LED 143 are normally sensed by phototransistor 145, which generates corresponding voltage pulses. These voltage pulses are processed for proper shape and pulse width and provided to the D inputs of flip-flops 167 and 181. The oscillator output is stretched in duty cycle by the pulse stretcher comprising elements 163, 168, 170 to an approximate square wave and applied, with opposite polarities, to the clock inputs of flip-flops 167 and 181. In normal operation, the D inputs of flip-flops 167 and 181 are sent high just before flip-flop 181 is clocked, so that the Q output of flip-flop 181 is set high. In addition, the D inputs of flip-flops 167 and 181 are set low before flip-flop 167 is clocked, so that the NOT Q output of flip-flop 167 is set high. These outputs maintain a high output on AND gate 182, whereas a low output on AND gate 182 comprises the STP signal.

If the light pulses from LED 143 are prevented from reaching phototransistor 145 by the collapse of tube 142, the D input of flip-flop 181 will be low when it is clocked; and the output of AND gate 182 will go low for an STP signal. Thus, the window will stop closing and reopen if tube 142 is collapsed by an impediment. In addition, if light reaches the phototransistor 145 during the time the LED is off, the D input of flip-flop 167 will be high when it is clocked; and the output of AND gate 182 will go low for an STP signal. Thus, the window will stop closing and reopen if the tube is cut open or light leaks in from some other source.

The embodiments of the invention in which an exclusive property or privilege is claimed are defined as follows:

1. A power window control for a vehicle having a door, a window driveable by an electric motor between open and closed positions, a source of DC electric power, an ignition switch having on and off positions to control access to the source of DC electric power, means for detecting an ignition key in the ignition switch with the vehicle door open and generating a key signal in response thereto and a door lock electrically activatable in response to a lock signal, the control comprising, in combination:

first and second bistable means effective to generate open and close window activation signals, respectively, in a first state and no such signals in a second state;

circuit means responsive to an operator generated close signal to set the first bistable means to its first state and, if the signal is still present after a predetermined time period, to reset the first bistable means to its second state and generate the close window activation signal independently of the first bistable means during continuation of the operator generated close signal;

circuit means responsive to an operator generated open signal to set the second bistable means to its first state and, if the signal is still present after a predetermined time period, to reset the second bistable means to its second state and generate the open window activation signal independently of the second bistable means during continuation of the operator generated open signal;

motor control means responsive to the close window activation signal to activate the motor in the window closing direction and further responsive to the open window activation signal to activate the motor in the window opening direction, the motor control means further including means effective, upon detection of motor stall, to reset both the first and second bistable means to the second state;

circuit means responsive to the lock signal, an ignition off signal and the key signal to reset the first bistable means to its second state and set the second bistable means to its first state to produce automatic window closing when the lock signal occurs, unless the ignition switch is in its on condition or the key is in the ignition switch with the door open;

an obstruction sensor responsive to the blocking of the window by an obstruction in the window closing direction short of the fully closed position to reset the second bistable means to its second state and set the first bistable means to its first state;

power supply means effective to control the connection of the source of DC electric power to all the various circuit means, the first and second bistable means and the motor control means, the power supply means being responsive to a vehicle ignition on signal to so connect the source of DC electric power and to a vehicle ignition off signal to disconnect the source of DC electric power after a predetermined time delay, the power supply means being further responsive to keep the source of DC electric power so connected past the end of the predetermined time delay in response to an open or close window activation signal initiated before the end of the predetermined time delay.

2. A power window control according to claim 1 in which:

the first and second bistable means comprise first and second flip-flops having clock, set, reset and D inputs and Q and Q NOT outputs, the flip-flops being connected as toggle flip-flops with the Q NOT outputs being connected to the D inputs;

the circuit means responsive to an operator generated close signal comprises first input means adapted to receive the operator generated close signal, a first debouncing capacitor connected across the first input means and a first RC timing circuit having an input connected to the first input means and an output connected through first connecting circuit means to the clock input of the first flip-flop to produce a clocking thereof, the first RC timing circuit comprising a first timing resistor in series with a first timing capacitor across the first debouncing capacitor and a first bypass diode across the first timing resistor, the junction of the first timing capacitor and first timing resistor being connected through second connecting circuit means to the reset input of the first flip-flop to reset it after the operator generated close signal has been received for the predetermined time period, the first bypass diode allowing quick reset of the first RC timing circuit with cessation of reception of the operator generated close signal;

the circuit means responsive to an operator generated open signal comprises second input means adapted to receive the operator generated open signal, a second debouncing capacitor connected across the second input means and a second RC timing circuit having an input connected to the second input means and an output connected through third connecting circuit means to the clock input of the second flip-flop to produce a clocking thereof, the second RC timing circuit comprising a second timing resistor in series with a second timing capacitor across the second debouncing capacitor and a second bypass diode across the second timing resistor, the junction of the second timing capacitor and second timing resistor being connected through fourth connecting circuit means to the reset input of the second flip-flop to reset it after the operator generated open signal has been received for the predetermined time period, the second bypass diode allowing quick reset of the second RC timing circuit with cessation of reception of the operator generated open signal;

the obstruction sensor comprises light sending means comprising an oscillator effective to produce a first pulsating electric signal at a predetermined frequency and a first duty cycle and further comprising a light source flashed by the oscillator, light receiving means comprising a light sensitive element and pulse shaping means responsive thereto to generate a second pulsating electric signal at the predetermined frequency and a second duty cycle in predetermined phase relationship to the first pulsating electric signal, logic means responsive to the first and second pulsating electric signals to generate the stop signal when a predetermined number of pulses from the first pulsed electric signal occur without corresponding pulses from the second pulsed electric signal, and a flexible, collapsible tube with a reflective inner surface connecting the light sending and receiving means, the tube being disposed adjacent the path of the closing window and thus being adapted to block the light from the light receiving means when collapsed by an impediment to window closing; and the power supply means comprises a power supply transistor effective to provide electric power to the remainder of the power window control when in a conducting state and not when in a non-conducting state, the power supply transistor being switched to a conducting state by an ignition on signal, the power supply means further comprising a power supply time delay circuit comprising capacitor means adapted to be quickly charged through a third timing resistor in response to the ignition on signal and slowly discharged through a fourth timing resistor in the absence of the ignition on signal to delay switching of the power supply transistor to its non-conducting state for a predetermined delay period, the capacitor means further being adapted to maintain its charge in response to the window open or close activation signal.

3. A power window control according to claim 2 in which the circuit means responsive to a lock signal, an ignition off signal and the key signal comprises a flip-flop set to a first state by the key signal when the key is out of the ignition with the door open and reset to a second state by the source of DC electric power when the ignition switch switches from an off to an on condition, the flip-flop in its first state having an output connected to prevent automatic window closing in response to the lock signal until the next ignition switching from off to on.

* * * * *